ALEXANDER R. MAXEY &
JOHN H. STREETS
INVENTORS

BY Robert G. Clay

ATTORNEY

ALEXANDER R. MAXEY &
JOHN H. STREETS
INVENTORS

BY Robert G. Clay

ATTORNEY

ALEXANDER R. MAXEY &
JOHN H. STREETS
INVENTORS

BY Robert G. Clay

ATTORNEY

ALEXANDER R. MAXEY &
JOHN H. STREETS
INVENTORS

BY Robert G. Clay

ATTORNEY

ALEXANDER R. MAXEY &
JOHN H. STREETS
INVENTORS

BY Robert G. Clay

ATTORNEY

ALEXANDER R. MAXEY &
JOHN H. STREETS
INVENTORS

BY Robert G. Clay

ATTORNEY 3,377,436
Patented Apr. 9, 1968

3,377,436

TAPE TRANSPORT FOR DRIVING BOTH IN-GOING AND OUT-GOING PORTIONS OF A TAPE LOOP WITH A SINGLE CAPSTAN

Alexander R. Maxey and John H. Streets, Redwood City, Calif., assignors to Ampex Corporation, Redwood City, Calif., a corporation of California Filed July 16, 1962, Ser. No. 210,265
20 Claims. (Cl. 179—100.2)

This invention relates to tape transports and particularly to such transports in which the tape is guided in a loop with transducing means engaging the tape of the loop.

In the magnetic tape transport art, a major problem has been that of ensuring constant velocity for the moving tape in the vicinity of the transducing heads, in order that the frequency of the reproduced signal will be the same as that of the signal that was originally recorded. Capstan and pinch roller combinations have been applied to the tape immediately downstream from the heads to provide such a fixed velocity, and much attention has been devoted to maintaining the tape tension constant because changes in the length of a segment of tape have the effect of altering the period of a signal in passage past the heads. The effects of longitudinal vibrations, termed "stiction" vibrations, that are induced in the tape by frictional slippage of the tape on the heads, have been reduced by reducing the unsupported length of tape between the capstan and heads. Finally, tension and length changes that are induced in the tape from vibrating mechanical elements, such as the rotating reels and tension compliance or sensing arms and reel brakes, have been isolated from the tape at the heads by means of a so-called "closed loop" construction in which the capstan is placed at the neck of a tape loop so as to drive both the in-going and out-coming portions of the loop at the desired constant velocity, with the heads engaging only the tape of the loop.

However, closed loops known in the art have usually been arranged with the tape in a single plane, and with the in-going and out-coming portions of the loop engaging opposite sides of the capstan. In consequence, eccentricity in the construction or revolution of the capstan induces alternating tensioning and slackening of the tape in the loop. When the side of the capstan having the lesser peripheral velocity is driving the in-going portion of the loop and the side of the capstan having the greater peripheral velocity is driving the out-coming portion of the loop, the loop is unduly tensioned. One hundred and eighty degrees later, when the slow side of the capstan is driving the out-coming portion and the fast side of the capstan is driving the in-going portion, the loop is unduly slackened.

Another difficulty with capstan arrangements known in the art is that the resilient surface of the pinch roller engages the tape in a zone that lies at least partly outside the zone of wrap of the tape on the capstan, so that the tape "sees" the pinch roller before it "sees" the capstan, with the consequence that vibration occurring within the resilient portion of the pinch roller is transmitted to the tape.

Another difficulty, applying particularly to broad-band and television magnetic tape recorders, is that suitable closed loop configurations have never been satisfactorily devised for such apparatus.

Another difficulty, applying particularly to broad-band and television magnetic tape recorders of the "helical-scan" type, is that the tape guiding elements therefore have never been sufficiently solidly and vibrationlessly mounted, except by means of unduly complicated and expensive structure.

The last mentioned disadvantage further applies to known mounting arrangements for capstans, tape turning and folding elements, and subsidiary fixed transducing heads such as those used for erase, control track and audio recording in broad-band and television recorders.

Accordingly, it is an object of the present invention to provide a closed loop arrangement for a magnetic tape recorder in which the tape in the vicinity of the transducing heads has a substantially constant predetermined velocity and is free of transient or vibratory tension, length and velocity changes.

It is another object of the present invention to provide a tape transport in which the tape in any portion of its path is unusually free of tension, length and velocity changes.

It is a further object of the present invention to provide a broad-band magnetic tape recorder having superior performance for predetermined purposes, while at the same time being simple and economical to manufacture and to operate, and of unusual ruggedness and durability.

It is still another object of the present invention to provide a simple and economical and light-weight magnetic tape television recorder suitable in cost and performance for a variety of applications.

A tape transport in accordance with the invention achieves these and other objects by making use of a pair of rotating transducing heads around the axis of which the tape is guided in a helical path that is in turn part of a closed tape loop. The in-going and out-coming portions of the loop are guided through a cross-over zone in which they travel on different levels but in the same direction. A single capstan is positioned at the cross-over zone to engage both portions of the loop on the same side of the capstan. A pair of pinch rollers clamp the respective portions of the loop against the capstan, and the zone of wrap of each portion of the loop on the capstan includes the zone of engagement of the corresponding roller and tape, so that the tape in the loop "sees" only the capstan. The members that are used for guiding the tape in its helical path are massively formed and in effect define a vibrationless base on which are solidly mounted other tape-engaging portions of the apparatus, including the capstan, the tape turning and folding guides, and the erase, control track and audio heads, so that these elements are likewise rendered less likely to induce vibrations in the moving tape.

It will be apparent that the loop configuration and structure above described may be used with magnetic tape recorders other than broad-band or television recorders, without sacrificing any of the usefulness thereof.

Further objects and advantages together with a better understanding of the invention may be had by reference to the following description, taken in conjunction with the accompanying drawings, in which:

FIGURE 8 is an enlarged broken-away plan of a portion of the apparatus shown in FIGURE 1; and FIGURE 9 is a plan view showing a variation of the apparatus shown in FIGURE 1.

Figure 1:
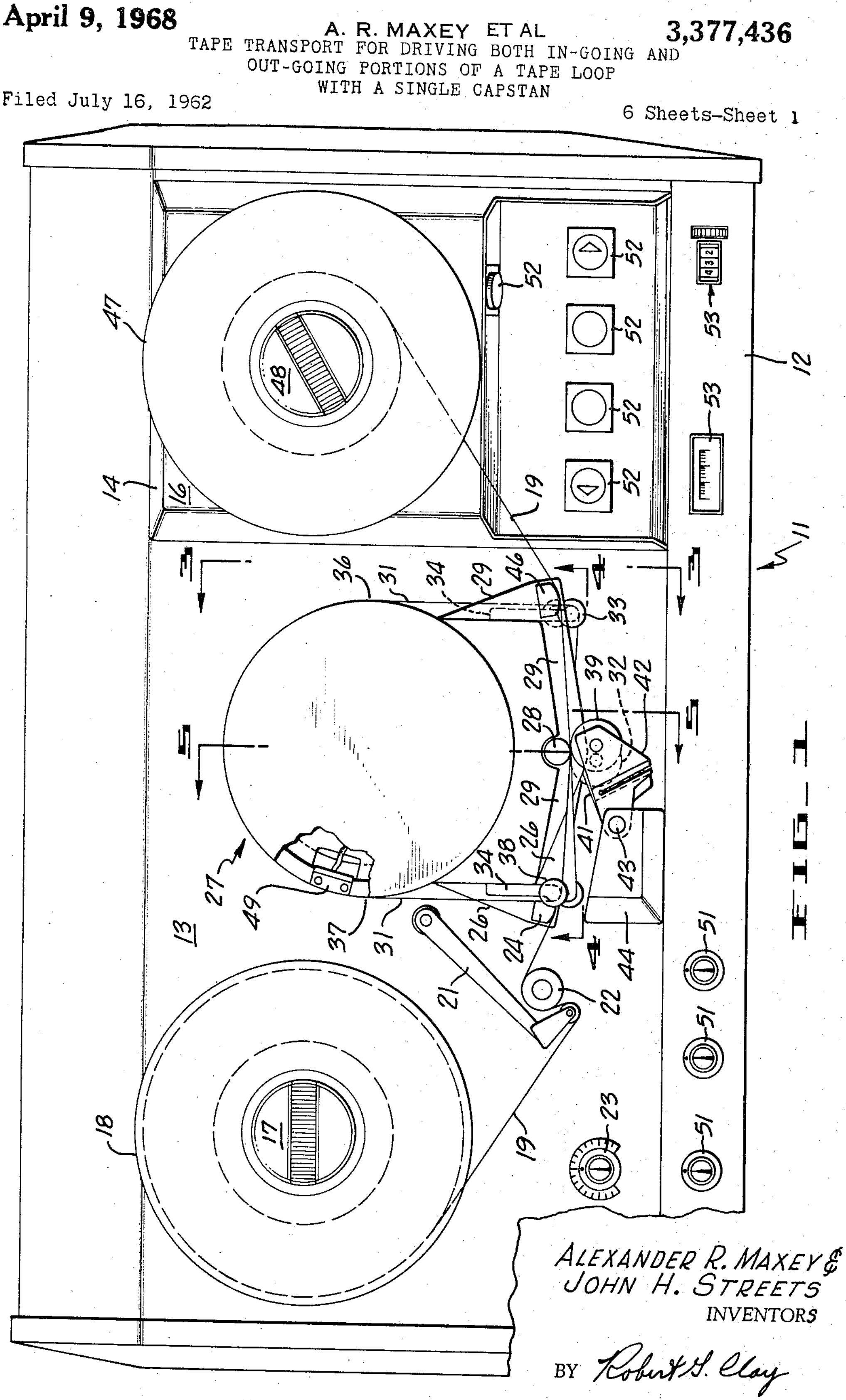
FIGURE 1 is a plan of a recorder constructed in accordance with the invention.

Referring now to FIGURE 1 there is shown a tape transport 11 including a cabinet 12 having a top plate 13 for the mounting of various transport element. A raised island 14 is topped with a higher level plate 16 which in effect constitutes a stepped or raised portion of the top plate 13. On the main portion of the top plate 13 is mounted a hub 17 for a supply reel 18 on which is coiled a tape 19. From the supply reel 18 the tape 19 is guided to a tension sensing compliance arm 21 and around a roller guide 22. The arm 21 is coupled to control a braking arrangement (not shown) for the supply reel 18 for the purpose of maintaining a desired tension in the tape 19. A knob 23 is mounted on the top plate and is coupled (in a manner not shown) to the braking apparatus for adjusting the bias thereof and for thus establishing any desired tape tension. From the roller guide 22, the tape 19 is guided around an erase head 24 which is mounted, not on the top plate 13, but on a flange 26 extending from a massive and solid scanning assembly 27. From the erase head 24 the tape is guided to a capstan 28, which is also solidly journaled in the flange 26 and in a higher level and parallel flange 29 also extending from the scanning assembly 27. This portion of the tape constitutes the in-going portion of a tape loop 31 and is clamped to the capstan 28 by means of a lower pinch roller 32. The tape is then guided to an angled turning and folding guide 33 to begin an upward slanting path to a position of direct engagement with the scanning assembly 27. The guide 33 has an extension 34 by which it is also solidly mounted on the scanning assembly 27. The tape engages the scanning assembly at a tangential point 36 and then follows a half helical path counter-clockwise as seen in the figure and upwardly out of the plane of the drawing sheet to a second tangential point 37, where it leaves direct engagement with the scanning assembly and proceeds in a still upwardly slanting path to a second turning and folding guide 38. At the guide 38 the tape makes a sharp bend and is guided along an upper level path, generally parallel to the top plate 13, to an upper portion of the capstan 28. This portion of the tape constitutes the out-going portion of the tape loop 31 and is clamped to the capstan 28 by means of an upper level pinch roller 39. The pinch rollers 32 and 39 are each mounted in appropriate yokes 41 and 42 from a single shaft 43 that is enclosed in a housing 44 extending upwardly from top plate 13. From the capstan 28 and pinch roller 39, the tape is guided to an audio transducing head 46, which is also solidly mounted on the upper level flange 29, and thence to a takeup reel 47 mounted on a hub 48 extending from the island 14 and upper level top plate 16. As shown in the broken-away portion at the left side of the scanning assembly 27, a control track transducing head 49 is solidly mounted in the scanning assembly to engage the tape during a portion of its half helical turn. Also shown in the figure are a number of control knobs 51, buttons 52 and other controls 53, which are of known design and use and are not further here described.

It will be noted that the tape coming from the reel 18 and proceeding along its path so far as the lower turning and folding guide 33 travels entirely in a plane parallel to and just above the lower level portion of the top plate 13. From the guide 33 to the tangential point 36 the tape travels in a first plane generally tangential to the scanning assembly 27 and in an upwardly climbing path. From the point 36 to the point 37 the tape travels in an upwardly climbing half helical turn, and from the point 37 to the upper level turning the folding guide 38 in a still upwardly climbing path in a second plane tangential to the scanning assembly 27 and generally parallel to the above mentioned first tangential plane. From the upper level guide 38 all the way to the takeup reel 47 the tape travels in a second upper level plane also generally parallel to the top plate

13. Further details of this arrangement may be seen in FIGURES 2, 3 and 4.

Figure 2:
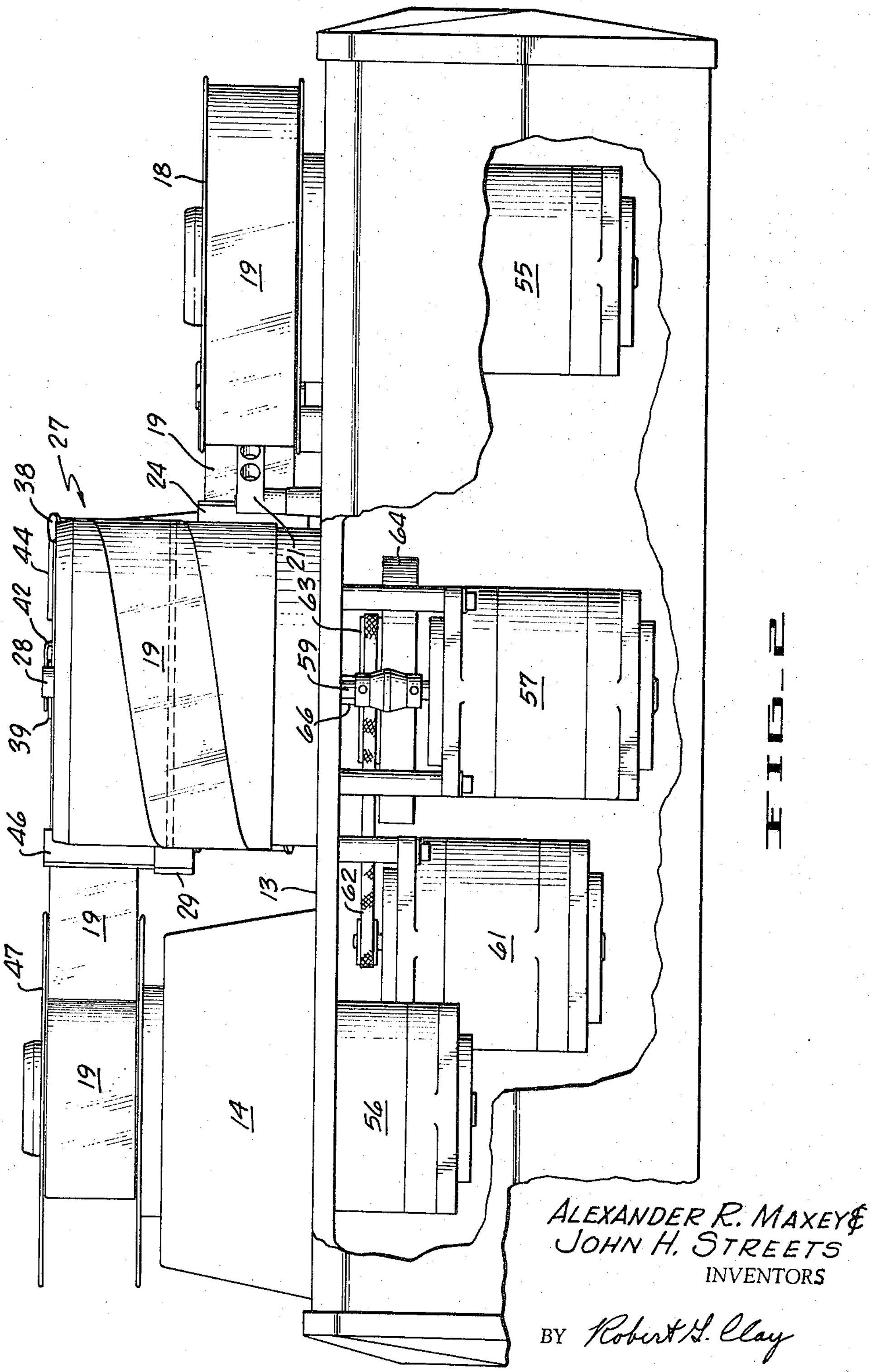
FIGURE 2 is a rear elevation of the recorder of FIGURE 1.

In FIGURE 2 are also shown a pair of supply and takeup reel drive motors 55 and 56 respectively, a scanning assembly drive motor 57 connected through a torsionally flexible coupling 58 to the lower end 59 of a scanning assembly drive shaft (later to be described); and a capstan drive motor 61, coupled through a drive belt 62 to a drum 63 and flywheel 64 mounted on and coupled to the lower end 66 of the capstan itself.

Figure 3:
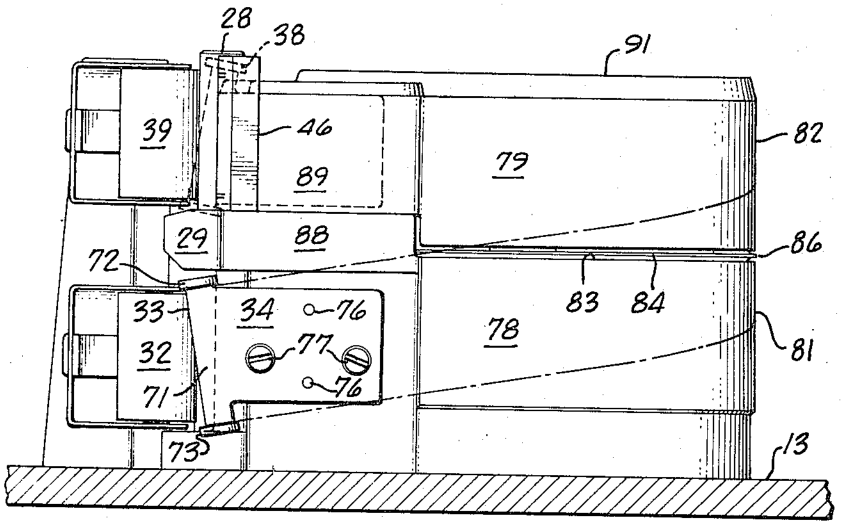
FIGURE 3 is an enlarged cross-sectional elevation taken along the plane of lines 3—3 of FIGURE 1.
Figure 4:
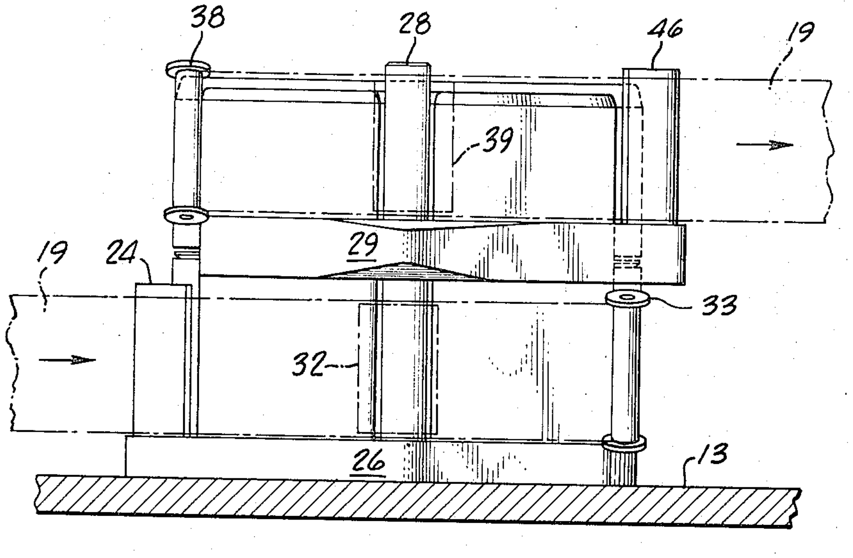
FIGURE 4 is an enlarged cross-sectional elevation taken along the plane of lines 4—4 of FIGURE 1.

FIGURE 3 is particularly illustrative of the manner in which the turning and folding guides 38 and 33 are formed and mounted solidly on the scanning assembly. In the art, such guides are usually extended upwardly from a top plate so as to be in effect cantilevered therefrom and subject to whipping and bending under vibration. In the present invention however, the guide 33 for example is formed as rounded post 71 having tape edge guiding flanges 72 and 73 at the respective upper and lower ends; and the extended portion 34 is connected bodily to the rear side of the post 71 in such a way as to support the post solidly throughout its length. The extending portion 34 is then firmly mounted on the scanning assembly as by means of dowels 76 and bolts 77. The post 71 lies in the same plane with the extension 34 and is tilted only in this plane, which is substantially parallel to the plane in which lies the tape path from the post 71 to the point 36 of tangency of the tape and scanning assembly. In this figure it will also be seen that the scanning assembly is composed of two massive portions, termed "male guide members" and including a lower member 78 and an upper member 79, the two members having coextensive semi-cylindrical guiding surfaces 81 and 82 respectively and being spaced apart along the axis of these surfaces to define a gap 83 within which rotates a rotating head drum 84 bearing a pair of diametrically oppositely mounted transducing heads 86 and 87. It will be seen that the tape in its half helical turn around the scanning assembly is inclined at such an angle as to climb the equivalent of one tape width in the 180° turn, so that each of the heads 86, 87, once on each revolution, sweeps the entire width of the tape for recording, or for reading a previously recorded magnetic track thereon. Exteriorly of the circular path described by the heads 86, 87, the members 78 and 79 have massive extensions 88 and 89 respectively, extending toward the capstan 28 and the in-going and out-coming portions of the tape loop, the extensions 88 and 89 being coupled firmly together so that the upper member 79 of the scanning assembly is solidly supported and the gap 83 is unalterably established at a predetermined spacing. In particular, the portion 88 is an upwardly extending portion which includes the upper flange 29 previously described, and the portion 89 is suitably formed to mate with the portion 88. The upper member 79 of the scanning assembly is fitted with a cover plate 91 which can be removed for access to the interior of the scanning assembly.

Figure 5:
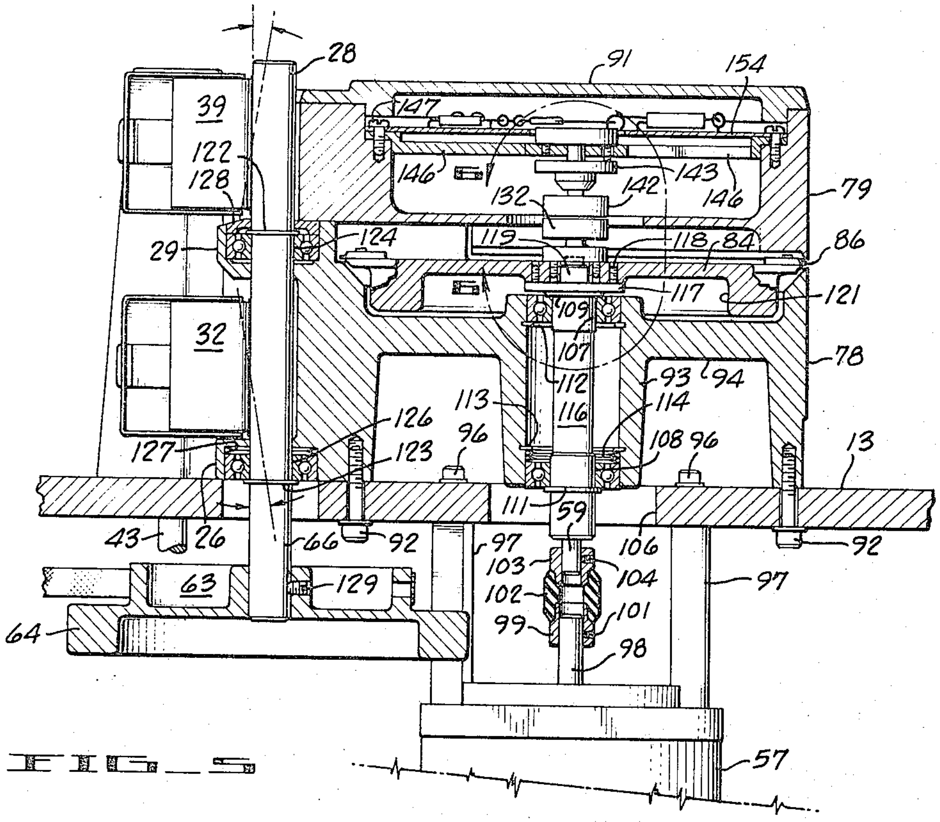
FIGURE 5 is an enlarged cross-sectional elevation taken along the plane of lines 5—5 of FIGURE 1.

In FIGURE 5 are shown further details of the mechanism above described. The lower and upper male guide members 78 and 79 are formed as hollowed members with interior flanges and journals for the mounting of moving parts. The lower member 78 is secured to the top plate 13 as by bolts 92 and has a central axial journal 93 supported by a flange 94. The scanning assembly drive motor 57 is mounted beneath the top plate 13 as by bolts 96 and sleeves 97 and the drive shaft 98 thereof is coupled to a collar 99 secured as by set screw 101. On the collar 99 is molded a tube 102 of torsionally flexible material, the upper end of which is molded onto a second collar 103 secured by a set screw 104 to the lower end 59 of the scanning assembly drive shaft. Above the lower end 59, the drive shaft is of enlarged diameter and passes upwardly through the top plate 13 via an opening 106 in the top plate. The shaft is mounted in the journal 93 as by means of anti-friction bearings 107 and 108 bearing against split rings 109 and 111 mounted on the shaft. The bearings are mounted in the journal 93 as by means of split rings 112 and 113 fitting into conforming recesses in the journal. The ring 113 is spaced substantially from the corresponding bearing 108 and the intervening space is filled with a compression spring 114, which provides a tight fitting but shock resistant suspension for the scanning assembly drive shaft 116. The shaft 116 has an upper flange 117 to which is bolted the head drum 84 as by means of bolts 118. The shaft 116 has a further upwardly extending portion 119 fitting into a corresponding centralized opening in the head drum 84 to ensure centralized mounting of the drum. The drum 84 has a massive downwardly extending peripheral portion 121 constituting a flywheel integral with the drum for damping speed variations of the rotating assembly.

Turning now to the left hand portion of FIGURE 5 the solid mounting of the capstan 28 is illustrated. A pair of split rings 122 and 123 are fitted at spaced points on the capstan for retaining a pair of anti-friction bearings 124 and 126. The bearings are in turn fitted within oppositely facing recesses in flanges 29 and 26, which extend from the lower scanning assembly male guide member 78. The mounting is further made tight and effectively shock resistant by means of a spring 127 fitted between the outer race of the lower bearing 126 and the adjacent portion of the flange 26. A cover plate 128 is fitted over the bearing 124 and is retained by an overlapping portion of the upper male guide member 79. The capstan fly-wheel 64 and drum 63 are formed as an integral unit and are attached to the lower end 66 of the capstan as by means of a set screw 129 engaging a flattened portion of the capstan.

Figure 6:
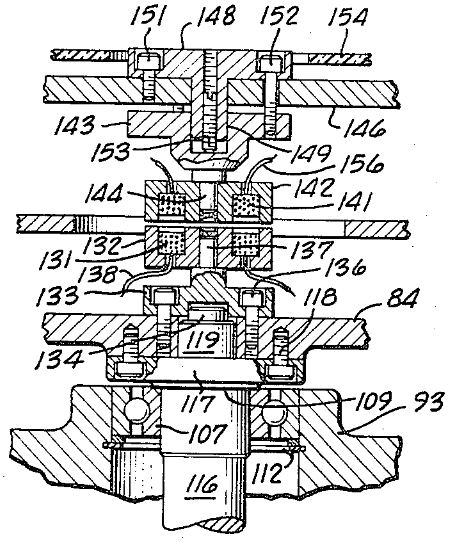
FIGURE 6 is a further enlarged fragmentary view of the portion enclosed within lines 6—6 of FIGURE 5.

Referring now generally to FIGURE 5 and particularly to FIGURE 6, there is shown an arrangement whereby an electrical coupling is provided without physical contact between the rotating heads 86, 87 and the non-rotating portions of the transport. The coupling is accomplished by means of a transformer, the coils of which are separately mounted, one on the rotating mechanism and the other on the stationary mechanism. A rotating transformer coil 131 is mounted on a core frame 132 at the axis of the rotating head drum 84. The mounting is by means of a flange 133 having a central cavity fitting over an extension 134 of the scanning assembly drive shaft 116 to ensure centralized mounting of the transformer. The flange is retained as by means of bolts 136 engaging the head drum 84. A shaft 137 extending upwardly from the flange 133 is press-fitted into a central recess in the core frame 132. Leads 138 from the coil 131 are coupled directly to the transducing heads 86, 87. A second coil 141 and core frame 142 are mounted in mirror-like confronting position with respect to the first mentioned coil 131 and core frame 132. A flange 143 has a shaft 144 extending into a central cavity in the core frame 142. The flange 143 is mounted on a spider 146, which in turn is firmly mounted on the upper male guide member 79 as by bolts 147. The mounting of the flange 143 on the spider is arranged to be adjustable to vary the axial spacing between the two transformer halves 131 and 141 as follows. A flange member 148 having a central stud portion 149 is centrally mounted on the spider with the stud portion 149 penetrating downwardly through an opening in the spider and extending into a conforming recess in the flange 143. The member 148 is secured to the spider 146 by means of three angularly equispaced bolts 151 and is further secured to the flange 143 as by means of three angularly equispaced bolts 152, which pass freely through suitable openings in the spider and are threaded into the flange 143. A set screw 153 is threaded through a central opening in the stud 149 so as to bear in compression against the stud member 143. Thus by loosening the set screw 153 and tightening the bolts 152, the axial spacing between the transformer halves 131 and 141 is increased; or the spacing can be decreased by loosening the bolts 152 and tightening the set screw 153. An electrical component circuit board 154 is mounted above the spider 146 as by means of the bolts 147 previously described, and the leads 156 from the upper transformer coil 141 are connected directly to electrical circuits mounted on the board 154.

Figure 7:
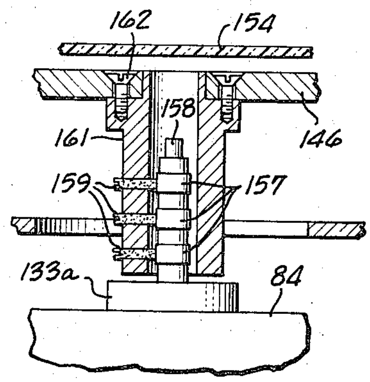
FIGURE 7 is a cross-sectional elevation showing a variation of the apparatus of FIGURE 6.
Figure 1:
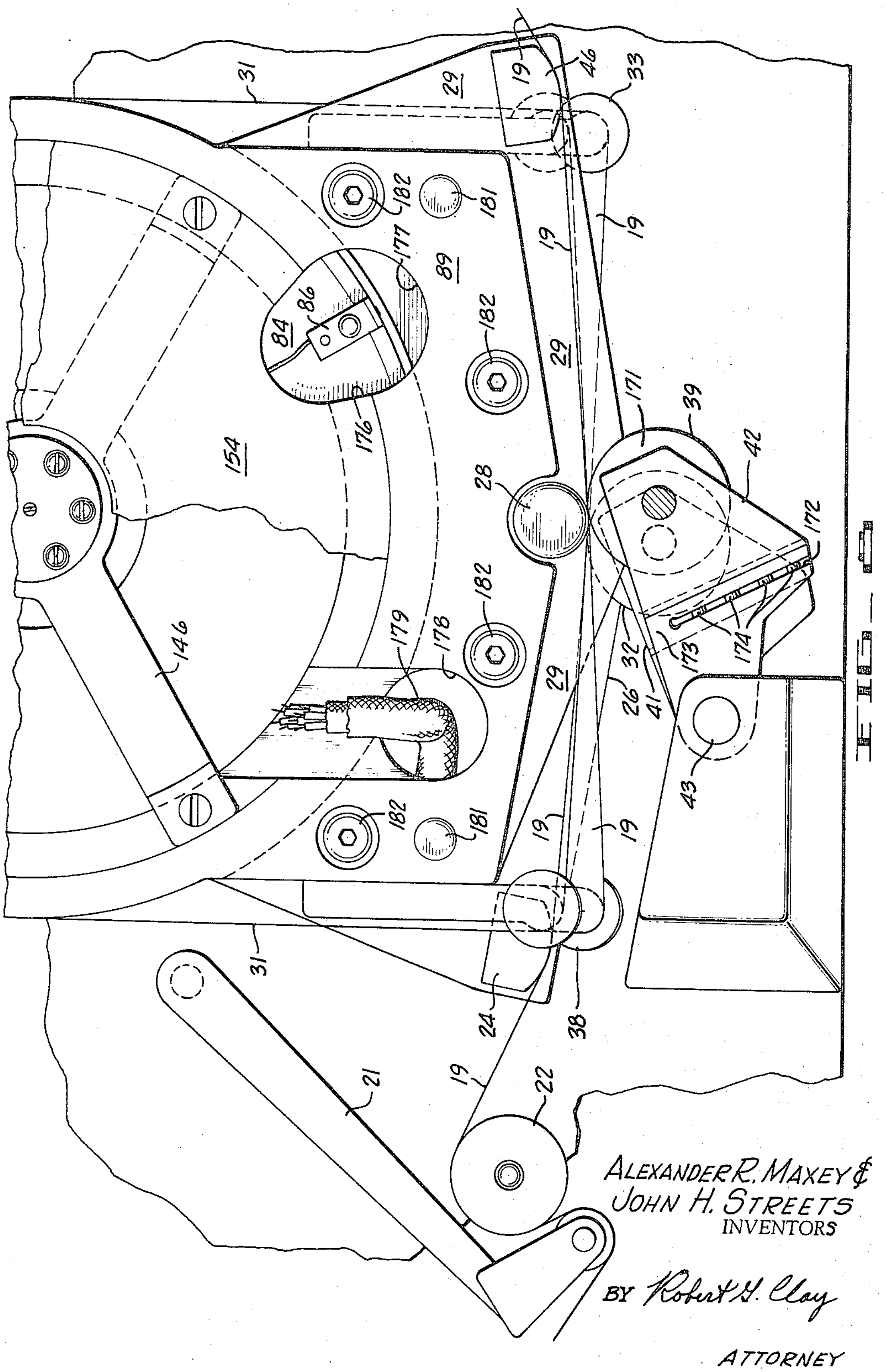
Figure 6:
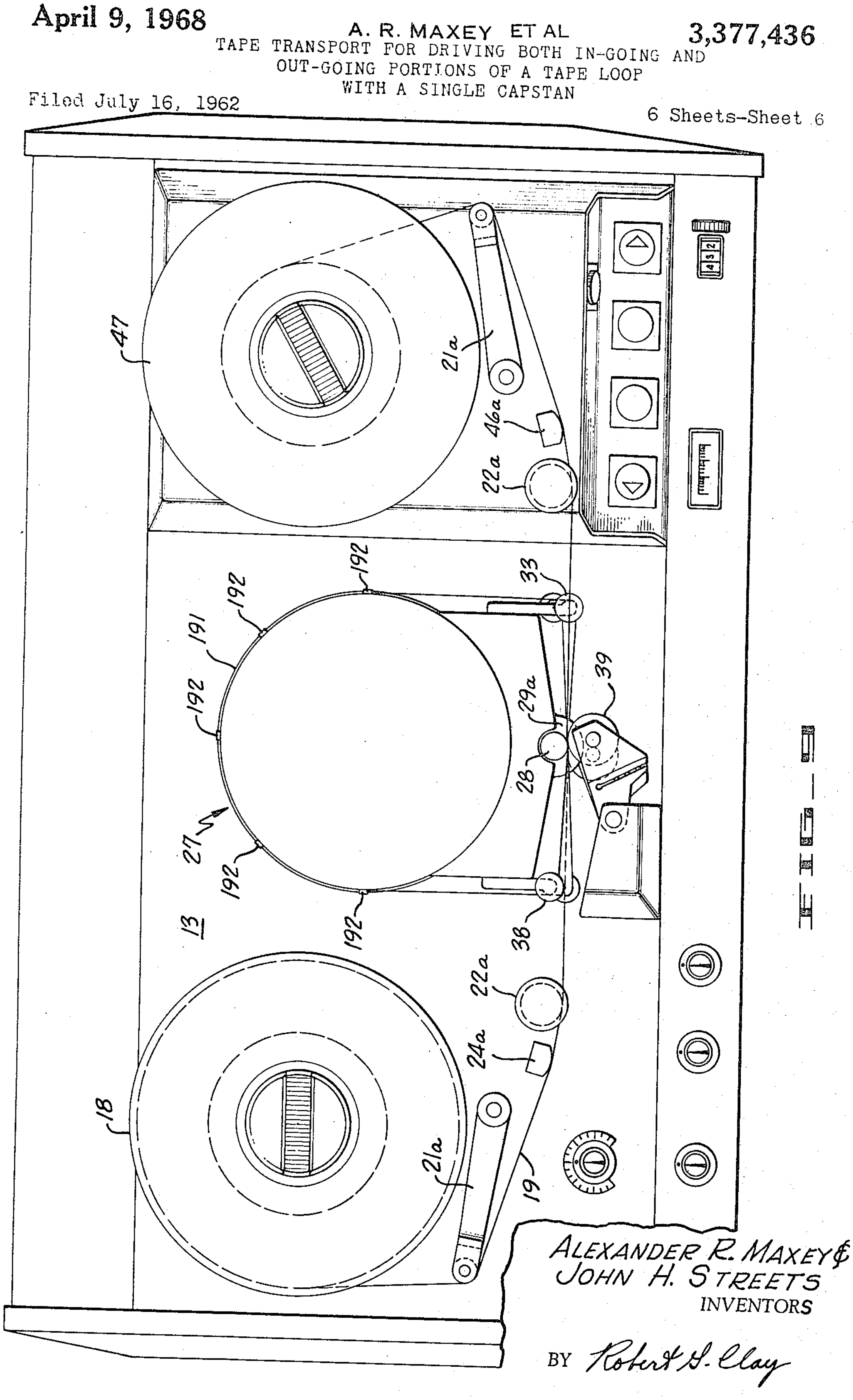

In FIGURE 7 there is shown an alternative arrangement for making an electrical coupling between the rotating and non-rotating parts of the scanning assembly. Instead of a transformer, there are provided a number of commutator segments or split rings 157 mounted on a shaft 158 extending from a flange **133*a* similar to the flange 133 of FIGURE 6. A corresponding number of brushes 159 engaging the members 157 are mounted in a sleeve 161 extending from the spider 146 and retained thereon as by means of bolt 162. Electrical connections are made directly between the brushes 159 and the electrical circuits mounted on the circuit board 154**.

Referring now to FIGURE 8 there are shown further details of the construction of the scanning assembly and the capstan and pinch rollers. One of the major problems in the use of a closed loop device such as is embodied in the present invention is that of isolating the tape within the loop and in the vicinity of the rotating heads from vibration and from tension and velocity changes deleterious to smooth and uniform recording or reading of the signal. One of the particular advantages of the closed loop of the present invention is that both the in-going and outcoming portions of the loop are engaged by the driving capstan 28 on the same side of the capstan. Thus if the capstan is to any degree out-of-round or is eccentrically mounted, nevertheless both portions of the capstan engaging the two portions of the tape loop have substantially the same peripheral velocity, and stretching or slackening of the tape in the loop is avoided. However, the pinch rollers are conventionally formed with resilient, usually rubber, tape engaging cylindrical portions 171 so as to provide firm and uniform engagement in clamping of the tape against the capstan. Vibrations that may be transmitted through the mechanism of the transport to the pinch rollers through the pinch roller mountings, and other vibrations originating in the resilient portions 171 of the pinch rollers themselves, must be isolated from at least that portion of the tape within the closed loop and preferably also from the portion of the tape outside the loop. In principle, the arrangement of the present invention provides a sector of wrap of tape on the capstan in which the tape is solidly backed and engaged with the surface of the capstan, and the area of tape that is engaged with the resilient portion 171 of the pinch roller is substantially smaller than and is spatially contained within the limits of the sector of wrap on the capstan. However, in carrying out this principle, the structure is conditioned by an additional requirement. To permit the folding and turning guides 33 and 38 to be tilted in only one plane, as previously described, it is necessary that they be arranged to guide the longitudinal centerlines of the two segments of tape between the guides and capstan in a single plane tangent to the capstan. To meet this requirement, while at the same time producing the wrap configuration above described, the pinch rollers of the present invention are angularly offset from the front to back centerline of the transport, the angle referred to being measured from the axis of the capstan 28, and the offset being in each case in a direction away from the loop itself and toward the nearest reel. In other words, as shown in FIGURE 8, the lower pinch roller 32 is angularly offset around the axis of the capstan in a clockwise direction so that the tape leaving the capstan at the lower level and entering the loop engages, at the point of departure, only the capstan and is solidly backed thereby; and likewise the upper pinch roller 39 is angularly offset in a counterclockwise direction so that the tape coming to the capstan at the upper level from the loop first engages only the capstan and not the pinch roller. Furthermore, the tape coming to the capstan at the lower level and the tape leaving the capstan at the upper level, outside the loop, are in both cases guided at such an angle to the capstan that a similar effect is provided.

It will be noted that the yokes 41 and 42 for mounting the pinch rollers are affixed solidly to the same rotating actuating shaft 43 which is operated by means (not shown) to engage or disengage the rollers. The pressure of the lower roller against the tape and capstan has a predetermined value which may or may not be adjustable. In either case however, it is quite important that the pressure of the upper pinch roller be adjustable to be equal to that of the lower pinch roller. Such adjustment is made by means of a construction of the upper yoke 42 in the solid central portion of which is formed a slot 172 so as to leave a relatively narrow throat portion 173 that is sufficiently flexible to permit bending adjustment of the angle of extension of the roller 39. The precise angle of extension is adjusted as by means of four adjusting members 174, two of which are tensioning bolts and the other two of which are compression set screws.

In FIGURE 8 the apparatus is shown as with the upper cover plate 91 removed so as to expose to view the spider 146, the circuit board 154, and the massive extending portion 89 of the upper male guide element 79. The board 154 and portion 89 have cavities 176 and 177 formed therein and mating in such a way as to provide a clear opening downwardly to the zone of the rotating head drum 84, to provide access to the transducing heads 86 and 87. Another opening or cavity 178 is formed in the portion 89 as a conduit for electrical wiring 179 going to the circuit board 154 and the control track transducing head 49. As shown in FIGURE 8 are a pair of dowels 181 and a number of bolts 182, by which the upper and lower massive extensions 88 and 89 of the male guide members are aligned and secured together.

In FIGURE 9 there is shown an alternative arrangement for the elements above described, in which the tape 19 coming from the supply reel 18 is guided first to the end of a tension sensing compliance arm **21*a*, thence to an erase head 24*a* mounted on the top plate 13, thence to roller guide 22*a* and thence directly to the capstan 28. The tape leaving the capstan 28 on the lower level is guided around a turning and folding guide 33 and in an upwardly inclined half helical path around the scanning assembly 27 to an upper turning and folding guide 38 and thence to the capstan 28, a roller guide 22*a*, an audio transducing head 46*a*, a second tension sensing compliance arm 21*a* and to the takeup reel 47. In this arrangement, the half helical tape path around the scanning assembly 27 is outlined by protruding tape edge guides, such as a flange 191 bordering the lower edge of the half helical tape path, and a number of protruding studs 192 bordering the upper edge of the half helical tape path. These protruding elements are useful in guiding the tape in a correct half helical path. It will be noted also that the capstan is journalled in an upper flange 29*a* extending from the scanning assembly and shaped particularly to embrace the capstan. A lower flange 26*a*, also extending from the scanning assembly and embracing and journalling the capstan, is of similar shape and is hidden beneath the flange 29*a*** in this plan view.

Thus there has been described a tape transport making use of a pair of rotating transducing heads around the axis of which the tape is guided in a helical path that is in turn part of a closed tape loop. The in-going and outcoming portions of the loop are guided through a crossover zone in which they travel on different levels but in the same direction. A single capstan is positioned at the cross-over zone to engage both portions of the loop on the same side of the capstan, so that the effects of irregularities in the construction and operation of the capstan are not transmitted to the tape of the loop. In addition, the zone of wrap of the tape on the capstan includes the zone of engagement of the pinch rollers, so that the effects of irregularities in the construction and operation of the pinch rollers are not transmitted to the tape in the loop. Also, the central transducing head assembly is formed with massive structure for the elimination of vibrations deleterious to the transducing function; and the major tape engaging elements, including the erase, control track and audio heads, the tape turning and folding guides, and the capstan itself, are solidly and firmly mounted on the transducing head assembly for elimination of vibration that might otherwise be transmitted to the tape. While the apparatus disclosed herein is particularly directed to broadband or television tape recording it will be apparent that the features above described are not limited thereto, but are useful in tape recorders of other types.

What is claimed is:

1. A magnetic tape transport wherein a magnetic tape having two surfaces is guided between a tape supply means and tape takeup means, comprising at least one magnetic transducing head, means for rotating said head, means for guiding said tape in a loop with a portion of said loop positioned so that said head engages said portion during rotation of said head and with in-going and out-going portions of said loop passing one another in non-contacting relationship at a cross-over zone fixedly positioned with respect to the axis of rotation of said head, and a capstan positioned adjacent the same surface of said in-going and out-going tape portions at said cross-over zone and engaging both of said in-going and out-going portions at said zone for driving the tape, said tape being driven by substantially the same side of said capstan, whereby irregularities in the drive of said tape by said capstan are minimized.

2. A magnetic tape transport in accordance with claim 1 in which said guiding means includes a pair of arcuate surfaces having their axes of generation extending coaxially and coaxial with the axis of rotation of said head, said head being rotated in a plane disposed between said surfaces and extending slightly beyond said surfaces, the tape engaging portion of said loop being guided in at least part of a helical turn on said arcuate surfaces.

3. A magnetic tape transport in accordance with claim 1 which further includes means for engaging the surfaces of said in-going and out-going tape portions which face away from said capstan and clamping both of said tape portions against substantially the same side of said capstan, and in which said in-going and out-going tape portions are aligned with respect to said capstan and clamping means in such a way that said clamping means engages only that part of the tape of said loop that is solidly backed by said capstan.

4. A magnetic tape transport in accordance with claim 1 which further includes a pair of pinch rollers for engaging the other surface of said in-going and out-going tape portions and clamping both of said tape loop portions against substantially the same side of said capstan for driving said tape, each of said pinch rollers being formed with a resilient cylindrical surface portion having the capability of distorting laterally when in pressurized engagement with said tape and capstan so as to engage a substantial area of said tape, the tape in each of said in-going and out-going portions being guided to said capstan in a first tangential plane thereof and in a substantial angle of wrap part way around said capstan and thence away from said capstan in a second tangential plane thereof, said angle of wrap including said substantial area of tape engaged by the corresponding pinch rollers, whereby said tape is engaged by said resilient surface portions of said pinch rollers only where said tape is soldily backed by said capstan, and iregularities and vibrations occurring in said resilient portions of said pinch rollers are not transmitted to said tape.

5. In a magnetic tape transport wherein tape having a pair of surfaces is guided between tape supply and takeup means in a loop around a central axis with transducing means engaging the tape of said loop, the improvement comprising:

means for guiding said tape in said loop with in-going and out-coming portions lying in substantially the same plane parallel to the axis of said loop, said portions passing one another at a cross-over zone in said plane and moving in the same rotational direction;

a capstan positioned adjacent the same surface of said tape portions at said cross-over zone; and a pair of pinch rollers for engaging the other surface of said tape portions and clamping said respective tape loop portions against substantially the same side of said capstan, said rollers in clamping position each being slightly angularly displaced from the other in a direction away from said loop and toward the nearest of said supply and takeup means;

whereby the effects of irregularities in the structure and functioning of said pinch rollers are isolated from the tape of said loop.

6. In a magnetic tape transport wherein tape having a pair of surfaces is guided between tape supply and takeup means in a loop around a central axis with transducing means engaging the tape of said loop, the improvement comprising:

means for guiding said tape in said loop with in-going and out-coming portions lying in substantially the same plane parallel to the axis of said loop, said portions passing one another at a cross-over zone in said plane and moving in the same rotational direction;

a capstan positioned adjacent the same surface of said tape portions at said cross-over zone; and a pair of pinch rollers for clamping said respective tape loop portions against substantially the same side of said capstan, said rollers in clamping position each being slightly angularly displaced from the other in a direction away from said loop and toward the nearest of said supply and takeup means;

said tape immediately outside said loop being guided to and from said capstan at such an angle that the areas of said tape that engage only said rollers are minimized;

whereby the effects of irregularities in the structure and functioning of said pinch rollers are isolated from said tape.

7. In a magnetic tape transport wherein tape having two surfaces is guided between tape supply and takeup means in a loop with transducing means engaging the tape of said loop, the improvement comprising:

means for guiding said tape in said loop with in-going and out-coming portions passing one another in non-contacting relationship at a cross-over zone and moving in the same rotational direction;

a capstan positioned adjacent the same surface of said tape portions at said cross-over zone;

a pair of pinch rollers for clamping said respective tape loop portions against substantially the same side of said capstan, said rollers in clamping position each being slightly angularly displaced from the other in a direction away from said loop and toward the nearest of said supply and takeup means;

said pinch rollers being mounted on respective arms on the same shaft for pivoting motion upon rotation of said shaft, the angular position of at least one of said arms being adjustable for equalizing the pinching pressures of said rollers on said tape and capstan.

8. In a magnetic tape transport wherein tape having two surfaces is guided between tape supply and takeup means in a loop around a central axis with transducing means engaging the tape of said loop, the improvement comprising:

means for guiding said tape so that the tape in said loop makes at least half a helical turn about said central axis with in-going and out-coming portions lying in substantially the same plane parallel to said axis, said portions passing one another at a cross-over zone in said plane and moving in the same rotational direction;

said transducing means including at least two transducing heads mounted for rotation about said axis and in a predetermined plane so that each of said heads comes into transducing relation with and sweeps the width of said tape in said loop once on each revolution;

a capstan positioned adjacent the same surface of said tape portions at said cross-over zone; and means for clamping both of said tape loop portions against substantially the same side of said capstan for driving said tape.

9. In a magnetic tape transport wherein tape having a pair of surfaces is guided between tape supply and takeup means in a loop around a central axis with transducing means engaging the tape of said loop, the improvement comprising:

means for guiding said tape so that the tape in said loop makes half a helical turn about said central axis at such an angle as to provide a displacement of one width of said tape in the direction of said axis as said tape moves around said half helical turn, said tape in said loop extending in substantially parallel tangential planes from the respective ends of said half helical turn for a distance greater than the radius of said half helical turn, and being then guided in a pair of substantially right-angular bends to form a pair of in-going and out-coming portions of said tape in said loop lying in substantially the same plane parallel to said axis, said portions passing one another at a cross-over zone in said plane and moving in the same rotational direction;

said transducing means including a pair of transducing heads mounted in diametrically opposed relation for rotation about said axis and in a predetermined plane so that each of said heads comes into transducing relation with and sweeps the width of said tape in said half helical turn of said loop once on each revolution;

a capstan positioned adjacent the same surface of said tape portions at said cross-over zone; and means for clamping both of said tape loop portions against substantially the same side of said capstan for driving said tape.

10. In a magnetic tape transport wherein tape having two surfaces is guided between tape supply and takeup means in a loop around a central axis with transducing means engaging the tape of said loop, the improvement comprising:

means for guiding said tape so that the tape in said loop makes half a helical turn about said central axis with in-going and out-coming portions lying in substantially the same plane parallel to said axis, said portions passing one another at a cross-over zone in said plane and moving in the same rotational direction;

said transducing means including two transducing heads mounted for rotation about said axis and in a predetermined plane so that each of said heads comes into transducing relation with and sweeps the width of said tape in said loop once on each revolution;

said tape guiding means including a pair of male guide members presenting a pair of guide faces conforming to and guiding said half helical turn of tape, said members being spaced on either side of said plane of rotation of said heads to define a gap for said rotation of said heads, and said members each having a massive portion extending toward said tape loop in-going and out-coming portions and secured together exteriorly of the path of head rotation, whereby the positions of said members relative to one another and the spacing therebetween are solidly established;

a capstan positioned adjacent the same surface of said tape portions at said cross-over zone; and means for clamping both of said tape loop portions against substantially the same side of said capstan for driving said tape.

11. In a magnetic tape transport wherein tape having a pair of surfaces is guided between tape supply and takeup means in a loop around a central axis with transducing means engaging the tape of said loop, the improvement comprising:

means for guiding said tape so that the tape in said loop makes a half helical turn about said central axis with in-goings and out-coming portions lying in substantially the same plane parallel to said axis, said portions passing one another at a crossover zone in said plane and moving in the same rotational direction;

said transducing means including two transducing heads mounted for rotation about said axis and in a predetermined plane so that each of said heads comes into transducing relation with and sweeps the width of said tape in said loop once on each revolution;

said tape guiding means including a pair of male guide members presenting a pair of guide faces conforming to and guiding said half helical turn of tape, said members being spaced on either side of said plane of rotation of said heads to define a gap for said rotation of said heads, and said members each having a massive portion extending toward said tape loop in-going and out-coming portions and secured together exteriorly of the path of head rotation, whereby the positions of said members relative to one another and the spacing therebetween are solidly established;

a capstan positioned adjacent the same surface of said tape portions and at said cross-over zone;

means for clamping both of said tape loop portions against substantially the same side of said capstan for driving said tape; and said transport being provided with a stepped top plate, said supply and takeup means being a pair of reels mounted for rotation in parallel planes and on adjacent steps of said top plate, said male guide members and said capstan and clamping means also being mounted on one of said steps with the cylindrical axes thereof parallel to the axes of said reels.

12. In a magnetic tape transport wherein tape having a pair of surfaces is guided between the tape supply and takeup means in a loop around a central axis with transducing means engaging the tape of said loop, the improvement comprising:

means for guiding said tape so that the tape in said loop makes half a helical turn about said central axis at such an angle as to provide a displacement of one width of said tape in the direction of said axis as said tape moves around said half helical turn, said tape in said loop extending in substantially parallel tangential planes from the respective ends of said half helical turn for a distance greater than the radius of said half helical turn, and being then guided in a pair of substantially right-angular bends to form a pair of substantially parallel in-going and out-coming loop portions lying in substantially the same plane parallel to said axis, said portions passing one another at a cross-over zone in said plane and moving in the same rotational direction;

said transducing means including at least two transducing heads mounted for rotation about said axis and in a predetermined plane perpendicular to said axis so that each of said heads comes into transducing relation with and sweeps the width of said tape in said loop once on each revolution;

said tape guiding means including a pair of male guide members presenting a pair of guide faces conforming to and guiding said half helical turn of tape, said members being spaced on either side of said plane of rotation of said heads to define a gap for said rotation of said heads, and said members each having a massive portion extending toward said tape loop in-going and out-coming portions and secured together exteriorly of the path of head rotation, whereby the positions of said members relative to one another and the spacing therebetween are solidly established;

said tape guiding means also including a pair of guides positioned at said right-angular bends of said loop so as to guide and turn said tape respectively to and from the inclined path of said half helical turn and respectively from and into the paths of said parallel in-going and out-coming tape portions;

said guides being mounted on respective flange elements lying in said parallel tangential planes and extending from respective ones of said male guide members to provide solid mounting of said guides;

a capstan positioned adjacent the same surface of said tape portion at said cross-over zone; and means for clamping both of said tape loop portions against substantially the same side of said capstan for driving said tape.

13. In a magnetic tape transport wherein tape having a pair of surfaces is guided between tape supply and take-up means in a loop around a central axis with transducing means engaging the tape of said loop, the improvement comprising:

means for guiding said tape so that the tape in said loop makes at least half a helical turn about said central axis with in-going and out-coming portions lying in substantially the same plane parallel to said axis, said portions passing one another at a cross-over zone in said plane and moving in the same rotational direction;

said transducing means including at least two transducing heads mounted for rotation about said axis and in a predetermined plane so that each of said heads comes into transducing relation with and sweeps the width of said tape in said loop once on each revolution;

said tape guiding means including a pair of male guide members presenting a pair of guide faces conforming to and guiding said half helical turn of tape, said members being spaced on either side of said plane of rotation of said heads to define a gap for said rotation of said heads, and said members each having a massive portion extending toward said tape loop in-going and out-coming portions and secured together exteriorly of the path of head rotation, whereby the positions of said members relative to one another and the spacing therebetween are solidly established;

a capstan positioned adjacent the same surface of said tape portions at said cross-over zone;

said extending portions of said male guide members being provided with flanges extending beyond said capstan between and below said respective in-going and out-coming portions of tape; and means for clamping both of said tape loop portions against substantially the same side of said capstan for driving said tape.

14. In a magnetic tape transport wherein tape having a pair of surfaces is guided between tape supply and take-up means in a loop around a central axis with transducing means engaging the tape of said loop, the improvement comprising:

means for guiding said tape so that the tape in said loop makes half a helical turn about said central axis with in-going and out-coming portions lying in substantially the same plane parallel to said axis, said portions passing one another at a cross-over zone in said plane and moving in the same rotational direction;

said tape guiding means including a pair of hollow male guide members presenting a pair of guide faces conforming to and guiding said half helical turn of tape, said members being spaced apart along said axis to define a gap, and said members each having a massive portion extending toward said tape loop in-going and out-coming portions and secured together beyond the radius of said half helical turn of tape, whereby the positions of said members relative to one another and the spacing therebetween are solidly established;

a drum journaled coaxially within said members for rotation at said gap, said drum having a massive integral portion for damping speed variations of said drum;

said transducing means including two transducing heads mounted at opposite ends of a diameter of said drum for rotation about said axis and in the plane of said gap so that each of said heads comes into transducing relation with and sweeps the width of said tape in said loop once on each revolution;

a capstan positioned adjacent the same surface of said tape portions at said cross-over zone; and means for clamping both of said tape loop portions against substantially the same side of said capstan for driving said tape.

15. In a magnetic tape transport wherein tape having a pair of surfaces is guided between tape supply and takeup means in a loop around a central axis with transducing means engaging the tape of said loop, the improvement comprising:

means for guiding said tape so that the tape in said loop makes half a helical turn about said central axis with in-going and out-coming portions lying in substantially the same plane parallel to said axis, said portions passing one another at a cross-over zone in said plane and moving in the same rotational direction;

said tape guiding means including a pair of hollow male guide members presenting a pair of guide faces conforming to and guiding said half helical turn of tape, said members being spaced apart along said axis to define a gap, and said members each having a massive portion extending toward said tape loop in-going and out-coming portions and secured together beyond the radius of said half helical turn of tape, whereby the positions of said members relative to one another and the spacing therebetween are solidly established;

a drum journaled coaxially within said members for rotation at said gap, said drum having a massive integral portion for damping speed variation of said drum;

said transducing means including at least two transducing heads mounted on said drum for rotation about said axis and in the plane of said gap so that each of said heads comes into transducing relation with and sweeps the width of said tape in said loop once on each revolution;

a transformer having a pair of first and second windings mounted respectively on separate first and second cores, said first core being mounted at the axis of said drum for rotation therewith and said first winding thereof being coupled to said transducing heads, and said second core being mounted on one of said male guide members with said second winding thereof in transducing relation with said first winding, for passing electrical signals to and from said transducing heads;

a capstan positioned adjacent the same surface of said tape portions at said cross-over zone; and means for clamping both of said tape loop portions against substantially the same side of said capstan for driving said tape.

16. In a magnetic tape transport wherein tape having a pair of surfaces is guided between tape supply and takeup means in a loop around a central axis with transducing means engaging the tape of said loop, the improvement comprising:

means for guiding said tape so that the tape in said loop makes half a helical turn about said central axis with in-going and out-coming portions lying in substantially the same plane parallel to said axis, said portions passing one another at a cross-over zone in said plane and moving in the same rotational direction;

said tape guiding means including a pair of hollow male guide members presenting a pair of guide faces conforming to and guiding said half helical turn of tape, said members being spaced apart along said axis to define a gap, said members each having a massive portion extending toward said tape loop in-going and out-coming portions and secured together beyond the radius of said half helical turn of tape, whereby the positions of said members relative to one another and the spacing therebetween are solidly established;

a drum journaled coaxially within said members for rotation at said gap, said drum having a massive integral portion for damping speed variations of said drum;

said transducing means including at least two transducing heads mounted on said drum for rotation about said axis and in the plane of said gap so that each of said heads comes into transducing relation with and sweeps the width of said tape in said loop once on each revolution;

a plurality of electrical slip rings mounted coaxially on said drum, and a corresponding plurality of brushes mounted on one of said male guide members and respectively engaging said slip rings for passing electrical signals to and from said transducing heads;

a capstan positioned adjacent the same surface of said tape portions at said cross-over zone; and means for clamping both of said tape loop portions against substantially the same side of said capstan for driving said tape.

17. In a magnetic tape transport wherein tape having a pair of surfaces is guided between tape supply and takeup means in a loop around a central axis with transducing means engaging the tape of said loop, the improvement comprising:

means for guiding said tape so that the tape in said loop makes half a helical turn about said central axis with in-going and out-coming portions lying in substantially the same plane parallel to said axis, said portions passing one another at a cross-over zone in said plane and moving in the same rotational direction;

said transducing means including two transducing heads mounted for rotation about said axis and in a predetermined plane so that each of said heads comes into transducing relation with and sweeps the width of said tape in said loop once on each revolution;

said tape guiding means including a pair of male guide members presenting a pair of guide faces conforming to and guiding said half helical turn of tape, said members being spaced on either side of said plane of rotation of said heads to define a gap for said rotation of said heads, and said members each having a massive portion extending toward said tape loop in-going and out-coming portions and secured together exteriorly of the path of head rotation, whereby the positions of said members relative to one another and the spacing therebetween are solidly established;

said tape guiding means also including a plurality of guide elements protruding from said faces of said male guide members and outlining the path of said half helical turn of tape thereon;

a capstan positioned adjacent the same surface of said portions at said cross-over zone; and means for clamping both of said tape loop portions against substantially the same side of said capstan for driving said tape.

18. In a magnetic tape transport wherein tape having a pair of surfaces is guided between tape supply and takeup means in a loop around a central axis with transducing means engaging the tape of said loop, the improvement comprising:

means for guiding said tape so that the tape in said loop makes half a helical turn about said central axis with in-going and out-going portions lying in substantially the same plane parallel to said axis, said portions passing one another at a cross-over zone in said plane and moving in the same rotational direction;

said transducing means including at least two transducing heads mounted for rotation about said axis and in a predetermined plane so that each of said heads comes into transducing relation with and sweeps the width of said tape in said loop once on each revolution;

said tape guiding means including a pair of male guide members presenting a pair of guide faces conforming to and guiding said half helical turn of tape, said members being spaced on either side of said plane of rotation of said heads to define a gap for said rotation of said heads, and said members each having a massive portion extending toward said tape loop in-going and out-coming portions and secured together exteriorly of the path of head rotation, whereby the positions of said members relative to one another and the spacing therebetween are solidly established;

said tape guiding means also including a plurality of guide elements protruding from said faces of said male guide members and outlining the path of said half helical turn of tape thereon, said elements including a flange aligned along one edge of said half helical tape path and at least one stud positioned at the opposite edge of said half helical tape path;

a capstan positioned adjacent the same surface of said tape portions at said cross-over zone; and means for clamping both of said tape loop portions against substantially the same side of said capstan for driving said tape.

19. In a magnetic tape transport wherein tape having a pair of surfaces is guided between tape supply and takeup means in a loop around a central axis with transducing means engaging the tape of said loop, the improvement comprising:

means for guiding said tape so that the mid-portion of the tape in said loop follows a bending path inclined to said central axis, the balance of said tape in said loop extending from the respective ends of said mid-portion in a pair of respective planes that are substantially parallel to said axis and to one another, and being then guided in a pair of substantially right-angular bends to form a pair of parallel in-going and out-coming portions of said tape in said loop, said in-going and out-coming portions lying in substantially the same plane parallel to said axis, said portions passing one another at a cross-over zone in said last-named plane and moving in the same direction;

a capstan positioned adjacent the same surface of said tape portions at said cross-over zone; and a pair of pinch rollers for clamping said respective tape loop portions against substantially the same side of said capstan, said rollers in clamping position each being slightly angularly displaced from the other in a direction away from said loop and toward the nearest of said supply and takeup means;

whereby the effects of irregularities in the structure and functioning of said pinch rollers are isolated from the tape of said loop.

20. In a magnetic tape transport wherein tape having a pair of surfaces is guided between tape supply and takeup means in a loop around a central axis with transducing means engaging the tape of said loop, the improvement comprising:

means for guiding said tape so that the mid-portion of the tape in said loop follows a bending path inclined to said central axis, the balance of said tape in said loop extending from the respective ends of said mid-portion in a pair of respective first planes that are substantially parallel to said axis and to one another, and being then guided in a pair of substantially right-angular bends to form a pair of parallel in-going and out-coming portions of said tape in said loop, said in-going and out-coming portions lying in substantially the same plane parallel to said axis and perpendicular to said first planes, said portions passing one another at a cross-over zone in said last-named plane and moving in the same direction;

said tape guiding means also including a pair of guide posts positioned at said right-angular bends of said loop to form said tape bends thereat, said posts being inclined to said axis but each lying in one of said parallel first planes so as to guide and turn said tape respectively to and from said bending inclined path and respectively from and into the paths of said parallel in-going and out-coming tape portions;

a capstan position adjacent the same surface of said tape portions at said cross-over zone; and a pair of pinch rollers for clamping said respective tape loop portions against substantially the same side of said capstan, said rollers in clamping position each being slightly angularly displaced from the other in a direction away from said loop and toward the nearest of said supply and takeup means;

whereby the effects of irregularities in the structure and functioning of said pinch rollers are isolated from the tape of said loop.

References Cited

UNITED STATES PATENTS 1,260,595 3/1918 Thompson ------------ 95—93

TERRELL W. FEARS, *Primary Examiner.*

IRVING L. SRAGOW, B. KONICK, *Examiners.*

J. R. GOUDEAU, *Assistant Examiner.*